United States Patent
Hou et al.

(10) Patent No.: US 10,596,056 B2
(45) Date of Patent: Mar. 24, 2020

(54) UPPER LIMB REHABILITATION ROBOT SYSTEM

(71) Applicant: Institute of Automation Chinese Academy of Sciences, Beijing (CN)

(72) Inventors: Zengguang Hou, Beijing (CN); Liang Peng, Beijing (CN); Weiqun Wang, Beijing (CN); Long Cheng, Beijing (CN); Guibin Bian, Beijing (CN); Xiaoliang Xie, Beijing (CN)

(73) Assignee: Institute of Automation Chinese Academy of Sciences, Beijing (CN)

( * ) Notice: Subject to any disclaimer, the term of this patent is extended or adjusted under 35 U.S.C. 154(b) by 381 days.

(21) Appl. No.: 15/326,132

(22) PCT Filed: Jul. 15, 2014

(86) PCT No.: PCT/CN2014/082270
§ 371 (c)(1),
(2) Date: Jan. 13, 2017

(87) PCT Pub. No.: WO2016/008109
PCT Pub. Date: Jan. 21, 2016

(65) Prior Publication Data
US 2017/0209327 A1    Jul. 27, 2017

(51) Int. Cl.
*A61H 1/00* (2006.01)
*A63B 23/12* (2006.01)
(Continued)

(52) U.S. Cl.
CPC .............. *A61H 1/00* (2013.01); *A61H 1/02* (2013.01); *A61H 1/0274* (2013.01);
(Continued)

(58) Field of Classification Search
CPC ...... A61H 1/00; A61H 1/0285; A61H 1/0274; A61H 1/02; A63B 23/12; A63B 21/4035;
(Continued)

(56) References Cited

U.S. PATENT DOCUMENTS

| | | | | |
|---|---|---|---|---|
| 5,466,213 A | * | 11/1995 | Hogan | A61H 1/02 482/4 |
| 2007/0149328 A1 | * | 6/2007 | Townsend | F16H 19/005 474/101 |
| 2007/0282228 A1 | * | 12/2007 | Einav | A63B 21/4021 601/33 |

FOREIGN PATENT DOCUMENTS

| | | | |
|---|---|---|---|
| CN | 101288620 B | * | 6/2010 |
| CN | 101874758 A | | 11/2010 |

(Continued)

OTHER PUBLICATIONS

Foreign CN-101288620 translated abstract.*
(Continued)

*Primary Examiner* — Thomas Sweet
*Assistant Examiner* — Rebecca Lynee Zimmerman
(74) *Attorney, Agent, or Firm* — Maier & Maier, PLLC

(57) ABSTRACT

The present invention discloses an upper limb rehabilitation robot system comprising a computer (8) and a rehabilitation robot (7), wherein the computer (8) is used for performing information interaction (11) with the rehabilitation robot (7), recording training information, sending control command to the rehabilitation robot (7), showing the virtual training environment, providing rehabilitation training visual feedback (14), and showing the control interface and rehabilitation training information; wherein the rehabilitation robot (7), acting as a system actuator, is connected to the computer (8) for receiving the control command from the computer (8) to complete the motion control and terminal force output, and sending sensor data to the computer (8) at the same time.

(Continued)

The upper limb rehabilitation robot system according to the present invention may provide a various ways of active and passive training of upper limb rehabilitation, which can enhance enthusiasm for trainings of a patient and increase the efficiency of rehabilitation.

9 Claims, 5 Drawing Sheets

(51) Int. Cl.
  *A63B 24/00* (2006.01)
  *A63B 21/00* (2006.01)
  *A63B 21/005* (2006.01)
  *A61H 1/02* (2006.01)
  *A63B 23/035* (2006.01)
  *A63B 71/06* (2006.01)
  *G09B 5/02* (2006.01)

(52) U.S. Cl.
  CPC .... *A63B 21/0058* (2013.01); *A63B 21/00178* (2013.01); *A63B 21/159* (2013.01); *A63B 21/4035* (2015.10); *A63B 21/4047* (2015.10); *A63B 23/03525* (2013.01); *A63B 23/03541* (2013.01); *A63B 23/12* (2013.01); *A63B 23/1209* (2013.01); *A63B 24/0087* (2013.01); *A63B 71/0622* (2013.01); *G09B 5/02* (2013.01); *A61H 2201/0176* (2013.01); *A61H 2201/14* (2013.01); *A61H 2201/1635* (2013.01); *A61H 2201/1659* (2013.01); *A61H 2201/5007* (2013.01); *A61H 2201/5028* (2013.01); *A61H 2201/5038* (2013.01); *A61H 2201/5043* (2013.01); *A61H 2201/5061* (2013.01); *A63B 21/005* (2013.01); *A63B 21/0051* (2013.01); *A63B 21/00192* (2013.01); *A63B 2024/0093* (2013.01); *A63B 2071/065* (2013.01); *A63B 2071/0647* (2013.01); *A63B 2071/0655* (2013.01); *A63B 2220/51* (2013.01); *A63B 2220/54* (2013.01); *A63B 2225/107* (2013.01)

(58) Field of Classification Search
  CPC .......... A63B 21/4047; A63B 21/00178; A63B 21/0058; A63B 21/159; A63B 23/03525; A63B 23/03541; A63B 23/1209; A63B 24/0087; A63B 71/0622; G05B 2219/39371; G05B 2219/40235; G05B 2219/40307; B25J 9/0087; B25J 9/0078; B25J 9/043; G09B 5/02
  See application file for complete search history.

(56) References Cited

FOREIGN PATENT DOCUMENTS

| | | | |
|---|---|---|---|
| CN | 102184322 A | 9/2011 | |
| CN | 103006415 A | 4/2013 | |
| WO | WO-9213504 A1 * | 8/1992 | .......... A61F 5/0102 |

OTHER PUBLICATIONS

Campos, L, et al "Development of a Five-Bar Parallel Robot with a Large Workspace" (2010), Proceedings of the ASME 2010 International Design Engineering Technical Conferences & Computers and Information in Engineering Conference, pp. 1-6 (Year: 2010).*
Mirbagheri, A et al (2013) Medical Robotics: State-of-the-Art Applications and Research Challenges. International Journal of Healthcare Information Systems and Informatics, 8(2), pp. 1-4. (Year: 2013).*
PCT/CN2014/082270 International Search Report.

* cited by examiner

UPPER LIMB REHABILITATION ROBOT SYSTEM

TECHNICAL FIELD

The present invention relates to the field of medical devices, and in particular to an upper limb rehabilitation robot system.

BACKGROUND OF THE INVENTION

With the aging of society intensifies, more and more aged person is upper limb paralyzed caused by such as stroke, which brings a lot of inconvenience to daily life. Through many rehabilitation trainings, paralyzed patients may arouse brain plasticity, restore some sports ability, achieve self-reliance, improve quality of life and return to society to the greatest extent. Robot aid rehabilitation training may save much human effort, perform a real time and quantitative assessment to the patients' rehabilitation level and a progressive training based on the rehabilitation state. The current rehabilitation robot mainly performs a passive training and cannot interact with patients, causing bad rehabilitation effect and poor experience of patients.

SUMMARY OF THE INVENTION

To address the defects in the prior art, the present invention provides an upper limb rehabilitation robot system, which provides various ways of upper limb rehabilitation active and passive training, enhances enthusiasm for training of a patient and increases the efficiency of rehabilitation.

To this end, the present invention provides an upper limb rehabilitation robot system comprising a computer and a rehabilitation robot,
  wherein the computer is used for performing information interaction with the rehabilitation robot, recording training information, sending control command to the rehabilitation robot, showing the virtual training environment, providing rehabilitation training visual feedback and showing the control interface and rehabilitation training information;
  wherein the rehabilitation robot, acting as a system actuator, is connected to the computer for receiving the control command from the computer to complete the motion control and terminal power output, and sending sensor data to the computer at the same time.

The upper limb rehabilitation robot system of the present invention can provide various ways of active and passive training for upper limb rehabilitation, enhance enthusiasm for trainings of a patient and increase the efficiency of rehabilitation.

BRIEF DESCRIPTION FOR DRAWINGS

DETAILED EMBODIMENTS

The technical solutions of the present invention are described in detail by means of the embodiments and drawings.

The combination of the rehabilitation robot and virtual training environment in the present invention can provide various ways of upper limb rehabilitation active and passive training, enhance enthusiasm for trainings of a patient and increase the efficiency of rehabilitation with the functions such as rehabilitation training and quantitative assessment.

Figure 1:
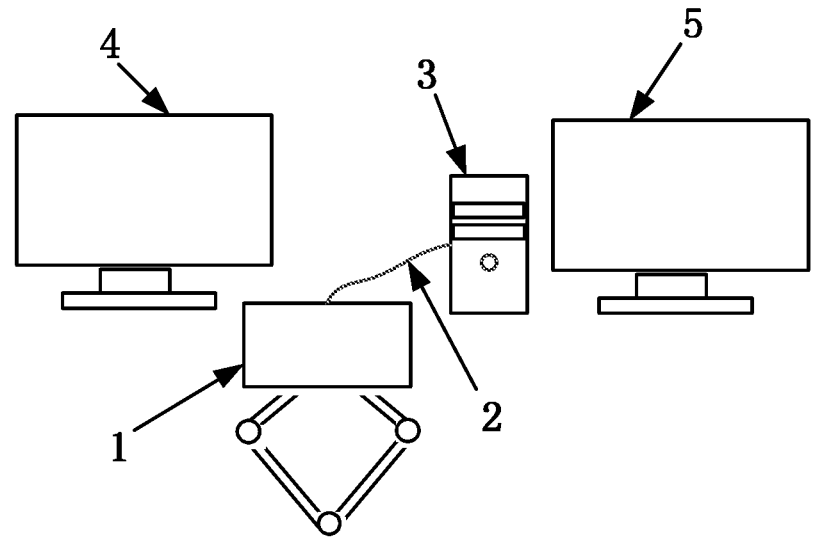
FIG. 1 is a schematic connection diagram of the computer of the upper limb rehabilitation robot system according to the present invention.
Figure 2:
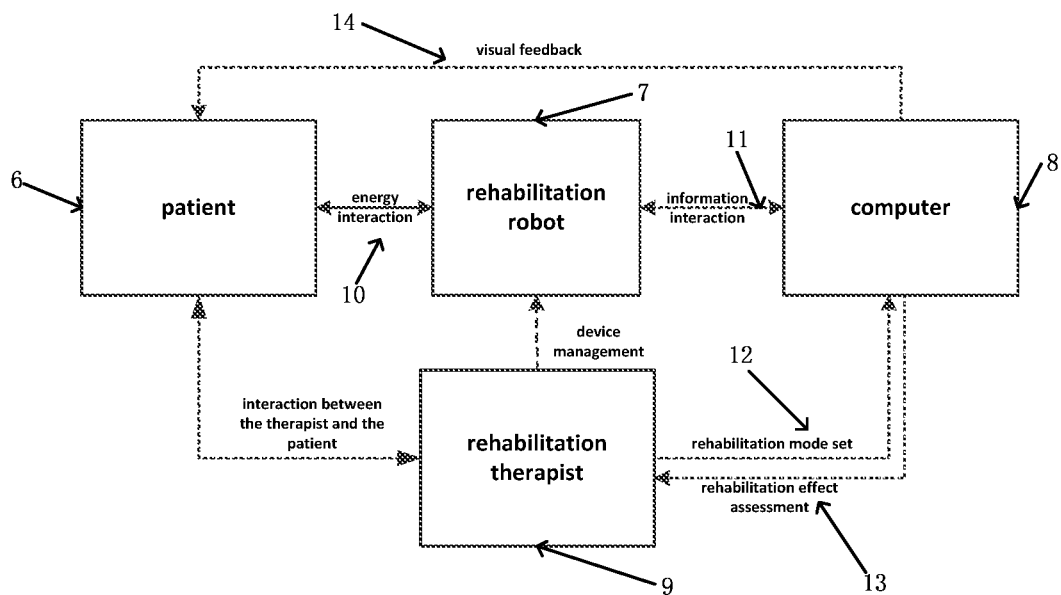
FIG. 2 is a schematic diagram of the upper limb rehabilitation robot system according to the present invention.

FIG. 1 is a schematic connection diagram of the computer of the upper limb rehabilitation robot system according to the present invention, and FIG. 2 is a schematic diagram of the upper limb rehabilitation robot system according to the present invention. As shown in FIGS. 1 and 2, the upper limb rehabilitation robot system according to the present invention comprises a computer 8 and a rehabilitation robot 7.

The computer 8 is used for performing information interaction with the rehabilitation robot 7, recording training information, sending control command to the rehabilitation robot 7, showing the virtual training environment, providing rehabilitation training visual feedback and showing the control interface and rehabilitation training information.

The rehabilitation robot 7, acting as a system actuator, is connected to the computer 8 for receiving the control command from the computer to complete the motion control and terminal force output, and sending sensor data to the computer 8 at the same time.

The rehabilitation robot 7, acting as an actuator for assisting to train a patient, can control the motion and force output in real time. The computer 8, as an information subsystem, records related information about patient training in real time, and sends motion and force output command to the rehabilitation robot at the same time by means of interacting with the rehabilitation robot 7.

The kinematic mechanism of the rehabilitation robot 7 is a five-bar parallel mechanism, which can achieve a force output in any direction of the motion in the planar workspace. The driving torque outputted by the electric machine and the magnetic brake is magnified and transmitted to the kinematic mechanism by cable transmission. A Patient interacts with the rehabilitation robot by means of a handle provided with a touch switch and a vibratory motor inside. Controller and driver provided inside the rehabilitation robot can control the motion and force output. The rehabilitation robot performs information interaction with the computer, and combines the virtual training environment, thereby achieving various ways of training, such as an active training, a passive training, and an active and passive training. A plurality of rehabilitation robots interconnected together in different ways can achieve bilateral upper limbs simultaneous training, simultaneous interactive training of a plurality of patients, simultaneous interactive training of patients with therapist, and network remote rehabilitation training.

In reference to FIG. 1 again, the rehabilitation robot 7 communicates with the computer 8 through a USB interface 2. One computer 8 may connect two displayers 4, one of which is used to show the virtual training environment to the patients and the other of which is used to show the control interface of the rehabilitation robot and training information about the patients to the therapist.

In reference to FIG. 2 again, the rehabilitation robot 7 is an actuator of the whole system, which directly contacts a patient 6 and performs the energy interaction 10 during the rehabilitation training. The computer 8 is an information system, which performs information interaction 11 with the rehabilitation robot 7, records the rehabilitation training information of the patients, and sends the rehabilitation training command etc. The computer 8 shows the patients the virtual training environment, acting as the visual feedback 14, to direct the patients to be trained and arouse enthusiasm for trainings of the patient. A therapist 9 sets the rehabilitation training mode 12 through the computer control interface, and at the same time, the computer 8 automatically records the motion and force information of the patients during the training, feedbacks the quantitative assessment 13 of the patients rehabilitation level to the therapist.

Figure 3:
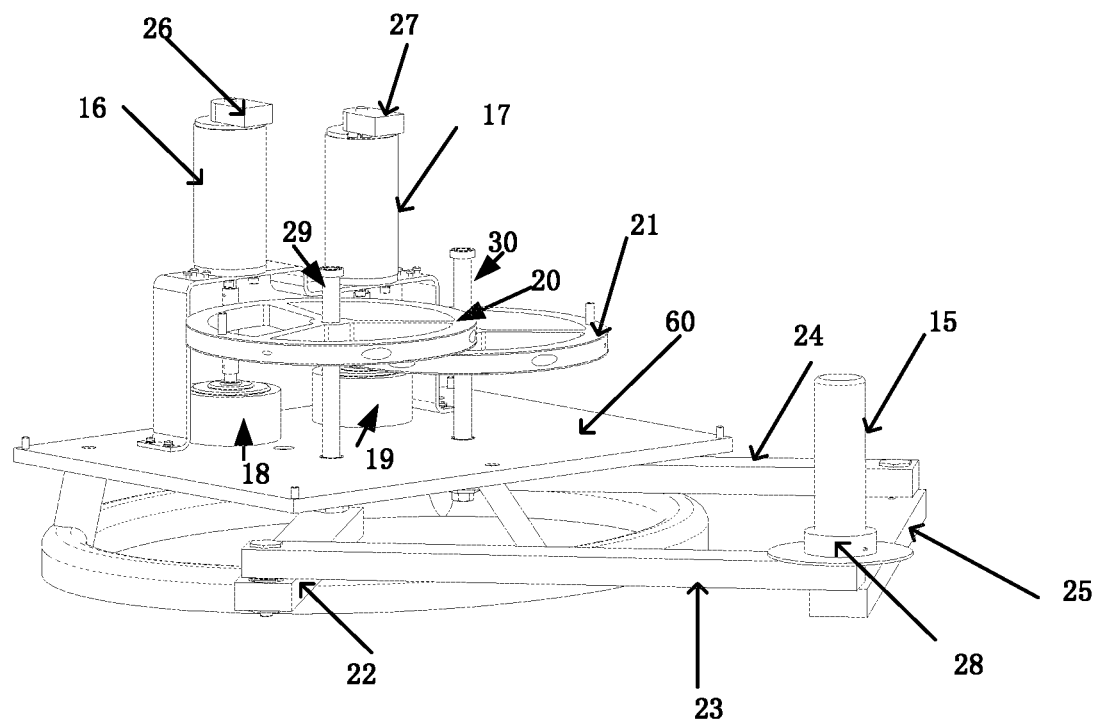
FIG. 3 is a schematic diagram of the mechanisms of the upper limb rehabilitation robot system according to the present invention.

FIG. 3 is a schematic diagram of the mechanisms of the upper limb rehabilitation robot system. As shown in FIG. 3, the rehabilitation robot is a planar mechanism with two degrees of freedom, interacting with patients by controlling a terminal handle 15. The patient grasps the terminal handle 15 of the rehabilitation robot and interacts with the rehabilitation robot, and the rehabilitation robot records the motion position of the patient by means of position sensors 26, 27, and a reciprocal force between the patient and the handle 15 by means of multidimensional force/torque sensor 28.

Electric machines 16, 17 and magnetic brakes 18, 19 as power sources of the rehabilitation robot, drive the motion mechanism to move. The magnetic brakes 18, 19 may choose magnetic hysteresis brake, magnetic powder brake or eddy current brake, and can enhance the force output ability of the system and help to improve the stability of system.

Figure 4:
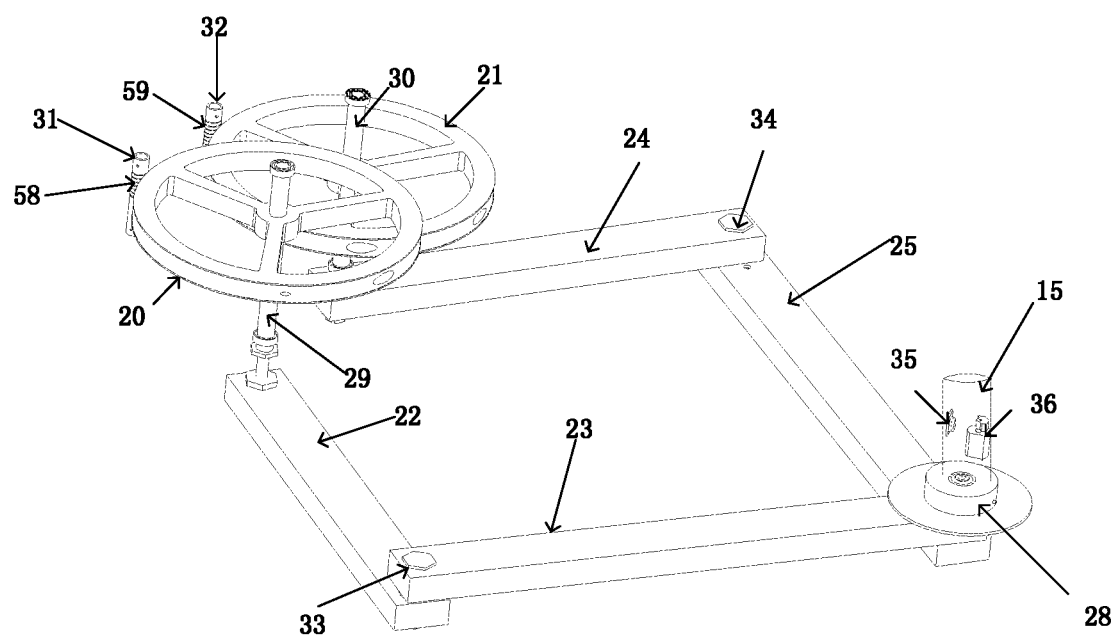
FIG. 4 is a schematic diagram of the kinematic mechanism and transmission mechanism of the upper limb rehabilitation robot system according to the present invention.

FIG. 4 is a schematic diagram of the motion mechanism and transmission mechanism of the upper limb rehabilitation robot system according to the present invention. As shown in FIG. 4, the motion mechanism of the rehabilitation robot is a five-bar parallel planar mechanism with two degrees of freedom. Bars 22, 23, 24, 25 and axes of rotation 29, 30 together form a five-bar parallel mechanism. The axes of rotation 29, 30 are fixed on a base 60 by bearings, and joints 33 and 34 are provided with bearings inside.

The handle 15 is provided inside with a touch sensor 35, which can detect whether the hand is contacting the handle. When the patient breaks away from the handle, the motion or force output stops to protect the patient. The handle is provided a vibratory motor 36 inside to perform operating such as training reminder to the patient by means of vibratory.

The rehabilitation robot transmits the driving force to the motion mechanism by cable transmission. The steel cable 58 wraps around the shaft sleeve 31 of the electric machine and a driving wheel 20, thereby forming a transmission mechanism to magnify the torque outputted by the electric machine 16 and magnetic brake 18 and to drive bar 22. The steel cable 59 wraps around the shaft sleeve 32 of the electric machine and a driving wheel 21, thereby forming a transmission mechanism to magnify the torque outputted by the electric machine 17 and the magnetic brake 19 and to drive the bar 24. The driving wheel 20 and the bar 22 are fixed through the axis of rotation 29, and the driving wheel 21 and the bar 24 are fixed through the axis of rotation 30. Relative to the gear transmission, the cable transmission has high transmission efficiency and no return difference, and can achieve reverse driving; relative to the direct drive, the cable transmission can magnify the torque outputted by the electric machine and the magnetic brake, and requires a little torque output ability of the electric machines 16, 17 and the magnetic brakes 18, 19, thereby an electric machine and a magnetic brake with less size can be chose to reduce the size and the cost of the whole system.

Figure 5:
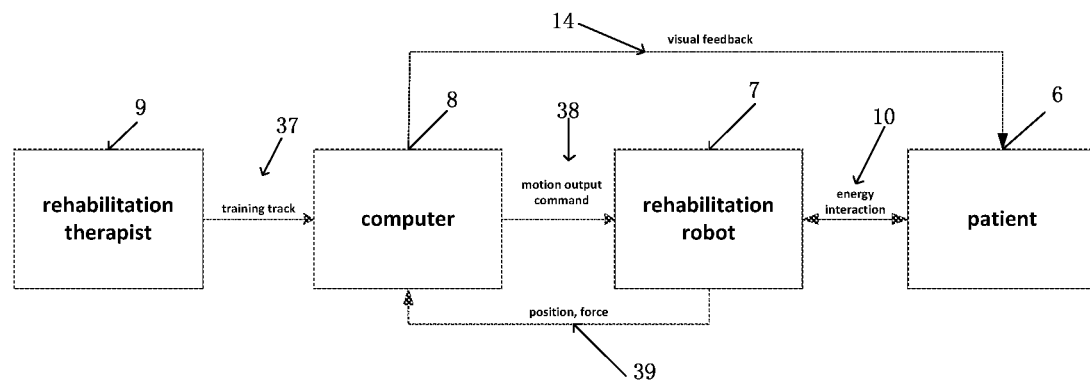
FIG. 5 is a schematic diagram of the passive training mode of the upper limb rehabilitation robot system according to the present invention.

FIG. 5 is a schematic diagram of the passive training mode of the upper limb rehabilitation robot system according to the present invention. As shown in FIG. 5, the rehabilitation robot system may perform a passive training mode. The robot brings the patient to do the repetitive movement with fixed tracks in the passive training mode. A training track 37 may be a system preset track, or may be recorded by the therapist 9 through the rehabilitation robot 7 in teaching mode. The computer 8 sends motion output command 38 to the rehabilitation robot 7 on the basis of the training track 37, and the rehabilitation robot 7 achieves motion control and brings patients 6 to be repetitively trained. During the training, the rehabilitation robot 7 feedbacks to the computer 8 the information such as position, force 39 in the interacting process 10 with patients 6.

Figure 6:
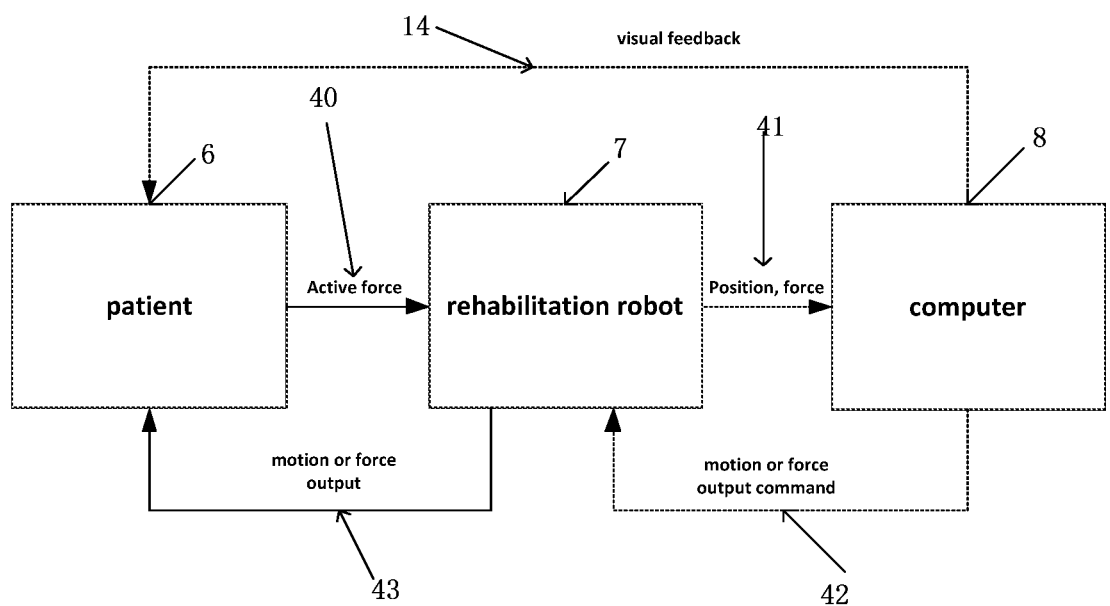
FIG. 6 is a schematic diagram of the active training mode of the upper limb rehabilitation robot system according to the present invention.

FIG. 6 is a schematic diagram of the active training mode of the upper limb rehabilitation robot system according to the present invention. As shown in FIG. 6, the upper limb rehabilitation robot system may perform the active training. Under the active training mode, a force 40 is actively applied to the rehabilitation robot 7 by a patient 6, and position and force information 41 is sent to the computer 8 by the rehabilitation robot 7. The computer 8 calculates a desired motion or force output on the basis of the impedance of the virtual training environment and the position, force information 41 of the rehabilitation robot by means of the principle of impedance control, and sends the motion or force output command 42 to the rehabilitation robot 7, while the rehabilitation robot 7 controls the motion or applies a force 43 to the patient.

Figure 7:
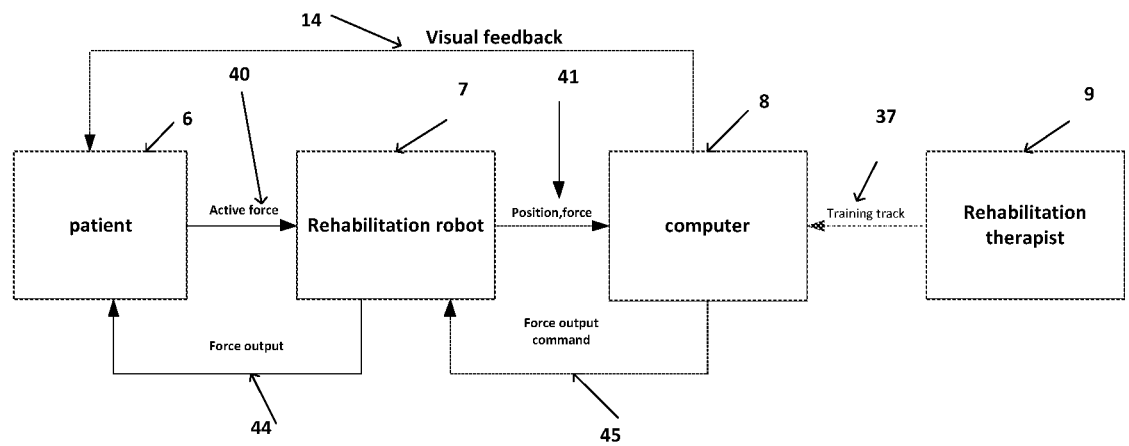
FIG. 7 is a schematic diagram of the active and passive training mode of the upper limb rehabilitation robot system according to the present invention.

FIG. 7 is a schematic diagram of the active and passive training mode of the upper limb rehabilitation robot system according to the present invention. As shown in FIG. 7, the active and passive training mode is the combination of the passive training and the active training. Under the active and passive training mode, the therapist presets the training track 37, the patient 6 applies an active force 40 to the rehabilitation robot 7, and the rehabilitation robot 7 feedbacks position and interacting force information 41 to the computer 8 in real time. The computer 8 decides that, if the motion of the patient 41 lags behind the target training track 37, the computer 8 sends force output command 45 to the rehabilitation 7, and the rehabilitation robot 7 applies an assistance force 45 to bring the patient 7 to move along the training track 37. When the motion of patient 41 exceeds the target training track 37, the computer 8 sends a force output command 45 to the rehabilitation robot 7, and the rehabilitation robot 7 applies a resistance. If the patient does not apply a force, the patient is brought to be moved by the rehabilitation robot along the track as the same as that of the passive training mode. The higher the motion control ability of the patient is, the closer to the desired motion the motion of the patient is, and the less the assistance or resistance force applied by the rehabilitation robot is.

Figure 8:
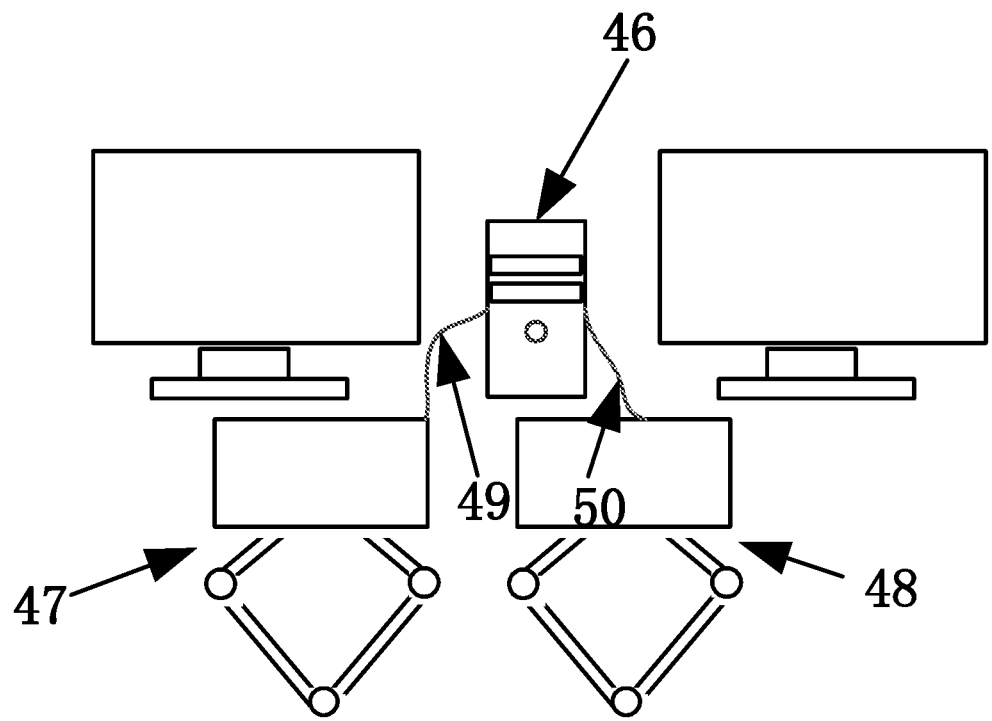
FIG. 8 is a schematic diagram of the double rehabilitation robots training mode of the upper limb rehabilitation robot system according to the present invention.

FIG. 8 is a schematic training mode diagram of double rehabilitation robots of the upper limb rehabilitation robot system according to the present invention. As shown in FIG. 8, one computer 46 can connect two rehabilitation robots 47, 48 through USB interfaces 49, 50, and one patient can interact with the two rehabilitation robots with two hands at the same time, thereby achieving bilateral upper limbs cooperative rehabilitation training. Further, it may be used to independently train two patients, or interactively train two patients, or interactively train a patient and his therapist.

Figure 9:
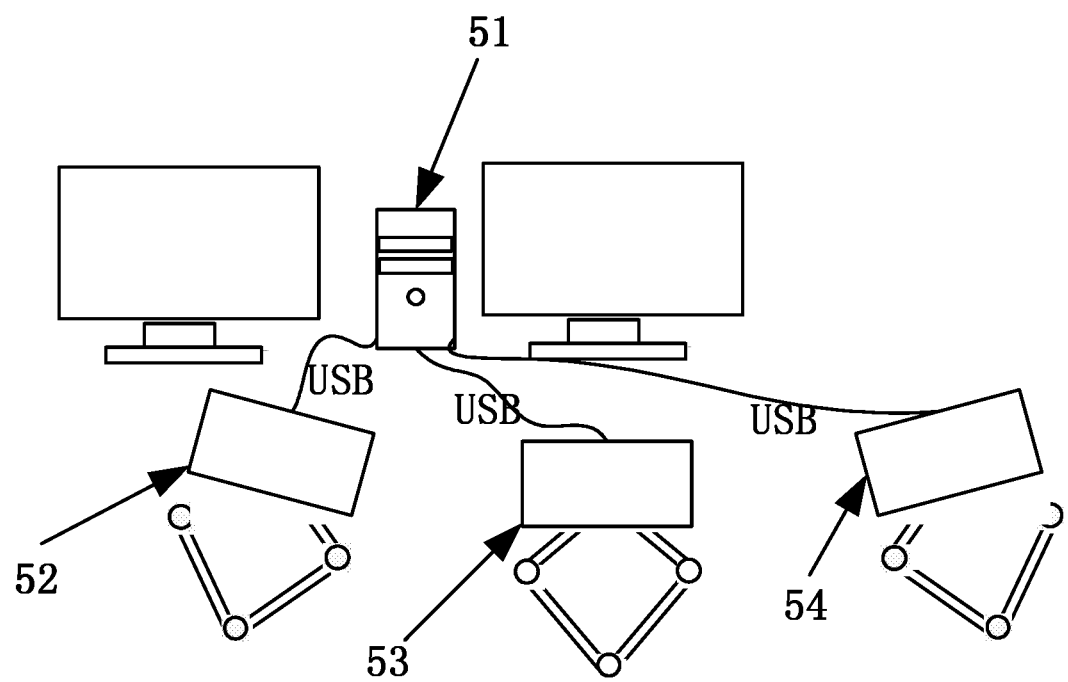
FIG. 9 is a schematic diagram of interactive training of a plurality of rehabilitation robots of the upper limb rehabilitation robot system according to the present invention.

FIG. 9 is a schematic diagram of interactive training of a plurality of rehabilitation robots of the upper limb rehabilitation robot system according to the present application. As shown in FIG. 9, one computer 51 can connect three or more rehabilitation robots 52, 53, 54. One patient may be trained by means of the rehabilitation robot respectively, and several patients or patients and therapist(s) may be interactively trained.

Figure 10:
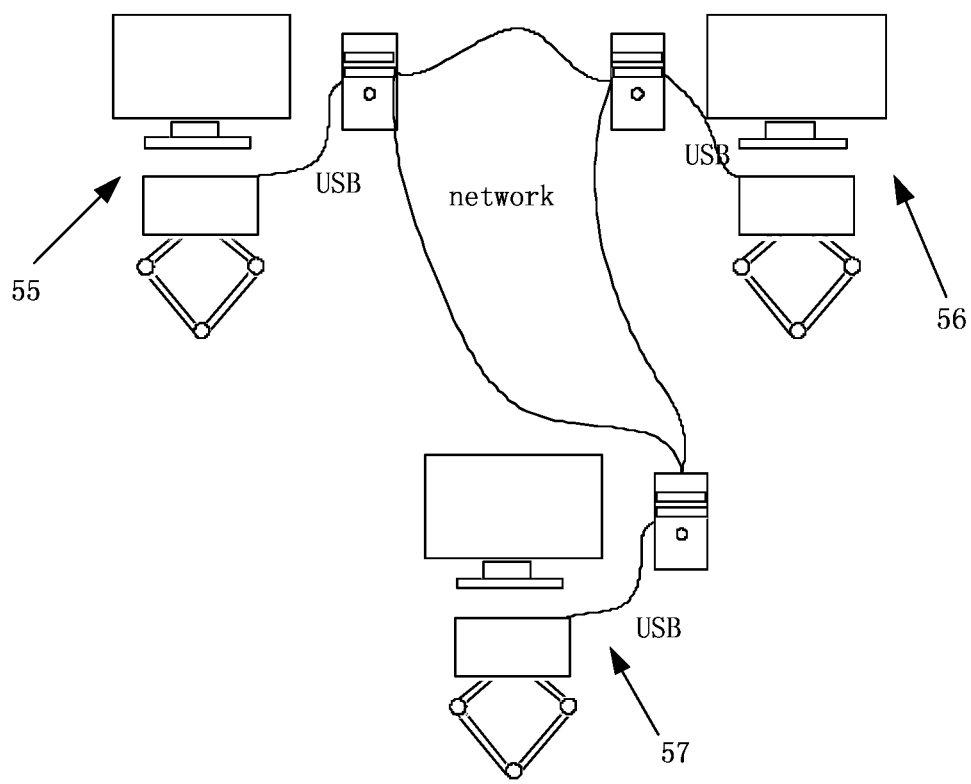
FIG. 10 is a schematic diagram of remote interactive training of system of a plurality of rehabilitation robots of the upper limb rehabilitation robot system according to the present invention.

FIG. 10 is a schematic diagram of remote interactive training of a plurality of rehabilitation robots of the upper limb rehabilitation robot system according to the present invention. As shown in FIG. 10, three or more upper limb rehabilitation robot system 55, 56, 57 may be connected by network and the like, thereby achieving remote interactive training of a plurality of systems.

Those skilled in the art should be further appreciated that, the exemplary units and steps of algorithm described in conjunction with the embodiment disclosed herein can be carried out by electronic hardware, computer software, or by a combination thereof. To clearly state the interchangeability between the hardware and software, the composition and steps of every example are generally described in the above description by functions. Whether these functions are implemented by hardware or software depends on the special applications and design constrains of the technical solution. Those skilled in the art can use different ways to achieve the functions for every special application, however these implementations are not to be construed to exceed the protection scope of the present application.

The steps of method or algorithm described in conjunction with the embodiment disclosed herein can be carried out by hardware, software modules executed by a processor, or by a combination thereof. The software modules can be disposed in a random access memory (RAM), a memory, a read-only memory (ROM), an electrically-programmable ROM, an electrically erasable programmable ROM, a register, a hard disc, a removable disc, a CD-ROM or any other form of storage medium known in the art.

The above-described specific embodiment describes in detail the object, technical solution and advantageous effect of the present invention. But it shall be appreciated that all the above described are merely specific embodiments of the present invention, which do not intend to limit the protection scope of the invention. Any modification, equivalent substitution and improvement made under the spirit and principle of the present invention shall fall within the protection scope of the present invention.

The invention claimed is:

1. An upper limb rehabilitation robot system comprising a computer and a rehabilitation robot;

wherein the computer is used for performing information interaction with the rehabilitation robot, recording training information, sending control command to the rehabilitation robot, showing the virtual training environment, providing rehabilitation training visual feedback and showing the control interface and rehabilitation training information;

wherein the rehabilitation robot, acting as a system actuator, is connected to the computer for receiving the control command from the computer to complete the motion control and terminal power output, and sending sensor data to the computer at the same time; and wherein the rehabilitation robot includes a kinematic mechanism that is a five-bar parallel mechanism formed by four arms and two rotation axes, in order to achieve a force output in any direction of the motion in a planar workspace, and wherein a driving torque outputted by an electric actuator is magnified and transmitted to the kinematic mechanism by a cable transmission.

2. The system according to claim 1, wherein the computer and the rehabilitation robot are connected by a USB interface, and interact with information; the computer connects two displayers, one of which is used for showing the virtual training environment and providing rehabilitation training visual feedback to a patient, the other of which is used to show the control interface and rehabilitation training information of the patient to the rehabilitation therapist.

3. The system according to claim 1, wherein the computer is specifically used for recording the rehabilitation training information of a patient in real time, such as motion and force, and providing a quantitative assessment to the patient and the rehabilitative therapist after statistical treatment.

4. The system according to claim 1, wherein the rehabilitation robot contains a controller and a driver, which are used for receiving a computer command, controlling the motion and force output of motion mechanism.

5. The system according to claim 1, wherein a terminal of the five-bar parallel mechanism is provided with a handle to interact with the patient, wherein the handle is provided inside with a touch sensor and a vibratory motor, and is provided underside with a multi-dimensional force/torque sensor.

6. The system according to claim 1, wherein the rehabilitation robot is driven by an electric machine and a magnetic brake, a motion mechanism is driven in a manner of cable transmission, and a position sensor is provided on the electric machine.

7. The system according to claim 1, wherein the computer connects two rehabilitation robots to train bilateral limbs of one patient at the same time, or to independently and interactively train two patients; or to interactively train between a patient and a rehabilitation therapist.

8. The system according to claim 1, wherein the computer connects more than two rehabilitation robots to independently train a plurality of patients, or to interactively train a plurality of patients, or to interactively train among a plurality of patients and rehabilitation therapist.

9. The system according to claim 1, wherein two or more said upper limb rehabilitation robot systems connect together to remotely and interactively train a plurality of patients, or to interactively train among patients and rehabilitation therapist.

* * * * *